United States Patent
Rao et al.

(10) Patent No.: US 8,552,848 B2
(45) Date of Patent: Oct. 8, 2013

(54) SYSTEM AND METHOD FOR COMBINED BLIND SPOT DETECTION AND REAR CROSSING PATH COLLISION WARNING

(75) Inventors: Manoharprasad K. Rao, Novi, MI (US); Mark Cuddihy, New Boston, MI (US); Eric L. Reed, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 11/839,903

(22) Filed: Aug. 16, 2007

(65) Prior Publication Data

US 2009/0045928 A1   Feb. 19, 2009

(51) Int. Cl.
*B60Q 1/00* (2006.01)

(52) U.S. Cl.
USPC ............ 340/435; 340/438; 340/436; 340/456

(58) Field of Classification Search
USPC .................. 340/435, 438, 436, 456
See application file for complete search history.

(56) References Cited

U.S. PATENT DOCUMENTS

| | | |
|---|---|---|
| 4,404,541 A | 9/1983 | Kodera et al. |
| 5,467,072 A | 11/1995 | Michael |
| 5,598,164 A | 1/1997 | Reppas et al. |
| 5,734,336 A | 3/1998 | Smithline |
| 5,756,988 A | 5/1998 | Furuta et al. |
| 5,767,793 A | 6/1998 | Agravante et al. |
| 5,940,011 A | 8/1999 | Agravante et al. |
| 6,069,581 A | 5/2000 | Bell et al. |
| 6,097,332 A | 8/2000 | Crosby, II |
| 6,265,968 B1 | 7/2001 | Betzitza et al. |
| 6,624,782 B2 | 9/2003 | Jocoy et al. |
| 6,734,807 B2 | 5/2004 | King |
| 6,812,831 B2 | 11/2004 | Ikeda et al. |
| 6,879,248 B2 * | 4/2005 | Flick ............................ 340/435 |
| 6,933,837 B2 * | 8/2005 | Gunderson et al. ........... 340/436 |
| 6,982,634 B2 | 1/2006 | Li et al. |
| 7,102,496 B1 | 9/2006 | Ernst, Jr. et al. |
| 7,385,486 B2 * | 6/2008 | Danz et al. ................... 340/435 |
| 7,495,550 B2 * | 2/2009 | Huang et al. ................. 340/435 |
| 7,612,658 B2 * | 11/2009 | Stopczynski ................. 340/436 |
| 2003/0210172 A1 | 11/2003 | Pleva et al. |
| 2004/0246170 A1 * | 12/2004 | Woodington et al. ........... 342/70 |
| 2005/0192725 A1 | 9/2005 | Li |
| 2007/0152803 A1 * | 7/2007 | Huang et al. ................. 340/435 |
| 2007/0182528 A1 * | 8/2007 | Breed et al. .................. 340/435 |
| 2008/0018523 A1 * | 1/2008 | Kelly et al. ..................... 342/70 |
| 2008/0042812 A1 * | 2/2008 | Dunsmoir et al. ............ 340/435 |
| 2008/0144500 A1 * | 6/2008 | Chen et al. .................... 370/235 |
| 2008/0211644 A1 * | 9/2008 | Buckley et al. ............... 340/435 |

FOREIGN PATENT DOCUMENTS

| | | |
|---|---|---|
| EP | 0 899 583 | 3/1999 |
| WO | WO-2005/051709 | 6/2005 |

* cited by examiner

*Primary Examiner* — George Bugg
*Assistant Examiner* — Naomi Small
(74) *Attorney, Agent, or Firm* — Franklin MacKenzie; Ford Global Technologies, LLC

(57) ABSTRACT

A vehicle is equipped with blind spot detection and rear crossing path collision warning system. Programmable maximum range limit radar sensors mounted on the vehicle are used to provide blind spot object detection warning when the vehicle is traveling in a forward direction and rear crossing path collision warning when the vehicle is traveling in a rearward direction.

15 Claims, 5 Drawing Sheets

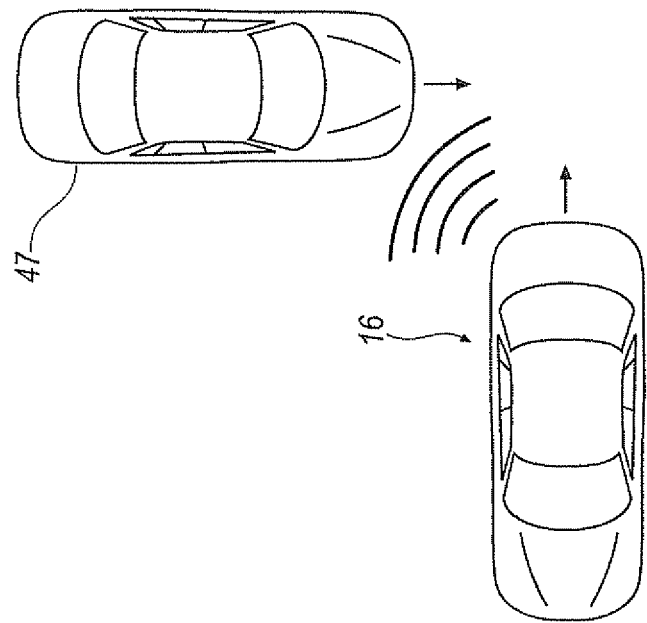
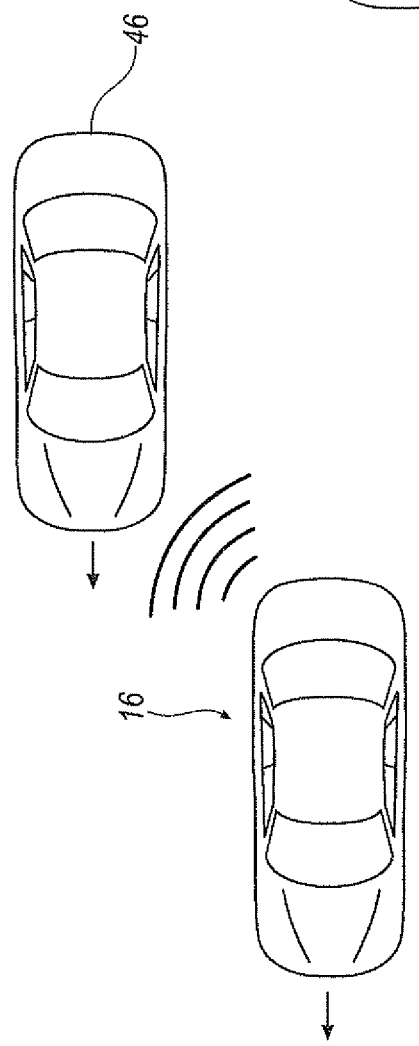

SYSTEM AND METHOD FOR COMBINED BLIND SPOT DETECTION AND REAR CROSSING PATH COLLISION WARNING

TECHNICAL FIELD OF THE INVENTION

The present invention relates to a combined blind spot detection and rear crossing path collision detection and warning system.

The present invention further relates to a system and method for detecting possible objects in a driver's blind spot or rear crossing path using radar based sensors that are already in use on a vehicle for blind spot and lane change detection.

The present invention further relates to a system and method for detecting possible collision objects in a driver's blind spot or rear crossing path using radar based sensors mounted rearward of the B pillar of a host vehicle that estimates speed, trajectory and threat level of target vehicles in the rear crossing path zone to provide warning to a driver of a possible rear or rear crossing path collision.

BACKGROUND OF THE INVENTION

Blind spot detection system radar sensors have programmable range capability that allows them to define a specific region of interest for detection of vehicles and other objects within the blind spot areas. Blind spot detection and rear crossing path systems with programmable range capability have set a fixed, programmable, maximum limit to avoid false detection of objects in the lane or road beyond the adjacent lanes, such as guardrails, vehicles in lanes beyond the adjacent lane to the host vehicle, etc. Software solutions are also available to detect and eliminate stationary objects such as guard rails to minimize false positives in the vehicle blind spot detection zones.

There is a continuing desire to improve such systems in a cost effective manner. Multi-beam radar systems with programmable range capabilities, electronic or mechanically scanning radar sensors with programmable range capabilities offer opportunities for providing multiple safety functions and features with the same radar sensors. It has been determined that it is possible to use the same radar sensors currently in use for blind spot detection and lane change systems and develop programming that facilitates the use of such installed sensors to include rear crossing path collision warnings in addition to blind spot detection. Moreover, there is a continuing desire to create such a system that includes determinations of approaching vehicle trajectory, vehicle speed, and threat level of a vehicle in the rear crossing path zones to provide warnings to a driver of a vehicle equipped with such a system.

BRIEF SUMMARY OF THE INVENTION

In one aspect, the present invention is directed to a combined blind spot detection and a rear crossing path collision warning system for host vehicles having an ECU with a memory. The system comprises a blind spot detection and a rear crossing path collision warning system equipped with radar sensors having multiple beam selection control and programmable range capability to allow the radar sensors to define a specific region of interest for detection of vehicle within a blind spot area or a crossing path collision zone. A rear crossing path warning zone is a system specified zone on either side of the vehicle located towards the rear of the vehicle in which a target vehicle traveling towards the host vehicle at a moderate speed, up to 40 to 45 kilometers per hour may present a collision threat to the host vehicle while it is traveling in a backward direction. Advantageously, the multiple beam selection control has a separate programmable maximum range limit for each beam and preferably, each beam partially overlaps neighboring beams. The blind spot detection and rear collision warning radar sensors preferably have programmable range capabilities, and are mounted in the rear portion of the vehicle i.e. from the B pillar rearward. Data signals from the rearward radar sensors are used to determine speed, trajectory and threat level of approaching vehicles or detected objects in the rear crossing path zones and if an appropriate threat level is determined, provide an appropriate warning to the driver or the system may initiate appropriate active counter measures.

In another aspect, the present invention relates to a method for continuously monitoring a blind spot detection and rear crossing path warning system, in a host vehicle. The method comprises monitoring at least one host vehicle blind spot and rear crossing path warning radar sensor diagnostics; determining whether the host vehicle blind spot and rear crossing path warning radar sensors are within operational specifications; determining whether the host vehicle is in reverse gear; determining the host vehicle state, reversing speed and vehicle trajectory; determining objects in rear crossing path detection zones on at least one side of the host vehicle; detecting at least one of distance, speed, direction, time in zone of at least one target object in the rear crossing path detection zone; classifying objects detected in the zone into threatening and non-threatening objects; determining whether any threatening objects are in the rear crossing path zone; determining a collision threat and estimating a severity of collision threat, and providing appropriate warning to an operator of the host vehicle of an impending threat event.

The method may further include determining whether the collision threat exists above a minimum threshold value. If the vehicle is in reverse gear and the threat event is above a minimum threshold, the method may further initiate automatic countermeasures to mitigate rear crossing path collisions. Once the collision threat has passed, the method includes deactivating the rear crossing pass collision warning and automatic countermeasures. In the event it is determined a vehicle is not in reverse gear, the vehicle is operated in a blind spot detection mode.

Finally, the method includes determining whether the radar sensors are functioning within specification. In the event it is determined that they are not, a fault is logged in the ECU and a warning indicator can be activated, such as a light on an instrument panel, to alert the operator that the rearward radar sensors are in need of service.

BRIEF DESCRIPTION OF THE DRAWINGS

FIG. 2A is a representational view of one warning to alert an operator of an impending blind spot event.

FIG. 2B is a representational view of one warning alert to an operator of an impending rear crossing path event.

DETAILED DESCRIPTION OF THE INVENTION

Figure 1:
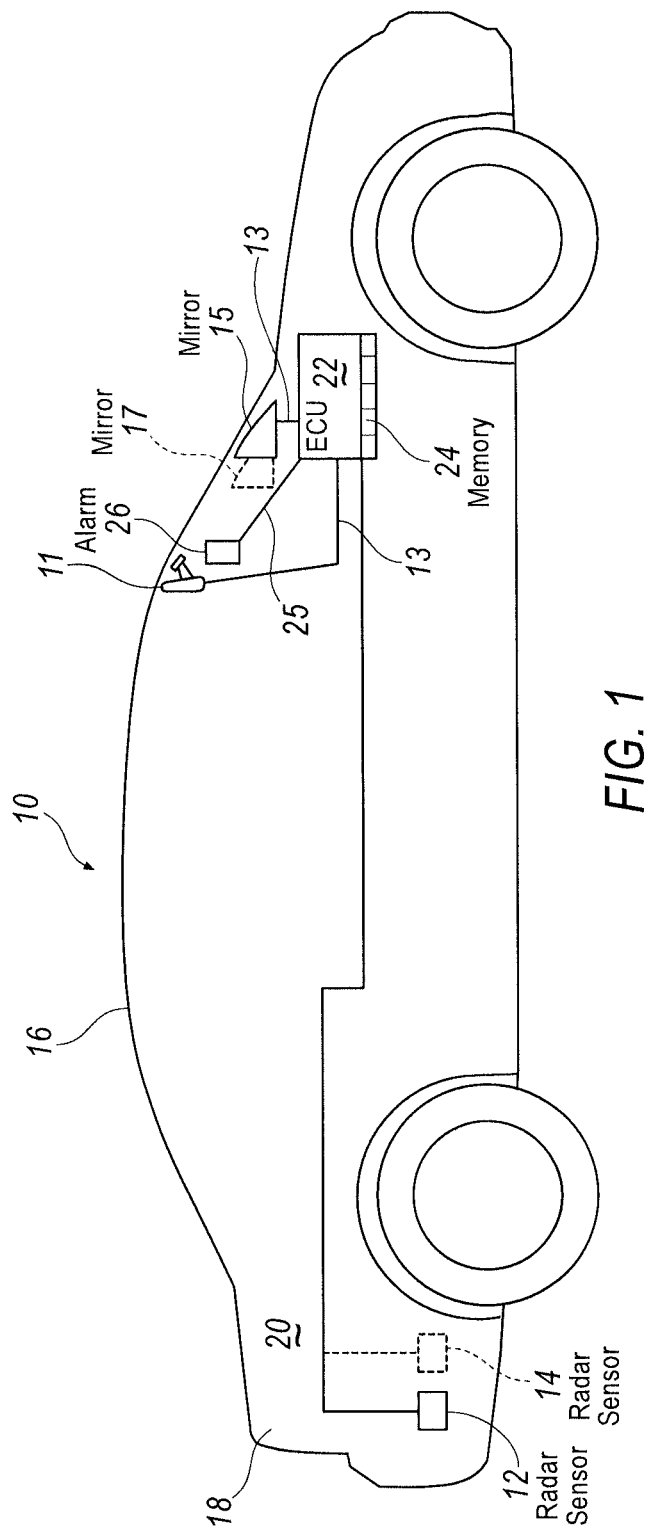
FIG. 1 is a schematic representation of a block diagram of the apparatus system of the present invention.

Turning now to the drawings wherein like numbers depict like structures, and particularly to FIG. 1, system 10 is comprised of at least two radar sensors 12, 14, one on each side of the vehicle, which may be positioned on a host vehicle 16, such that they are in the rear 18 and on sides 20 of the vehicle so that any blind spots are under surveillance. While one side of a vehicle is discussed, it is apparent to those skilled in the art that both sides of the vehicle are equipped with identical radar sensors and are equally covered. Automotive side view mirrors 15 and 17 on both sides of the vehicle and interior mounted rear view mirror 11 provide rear view information to the vehicle operators. In addition, rear view mirror 11 and side view mirrors 15 and 17 are electronically connected 13 to ECU 22 so that a warning alert for blind spot or rear crossing incidents can be signaled through the rear view mirror and side view mirrors as is better seen with reference to FIG. 2A and FIG. 2B. It is possible to have blind spots in the adjacent lanes towards the rear of the host vehicle on either side of the vehicle if the side view mirrors are not properly adjusted. Typically this side blind spot zone 48 is a system defined region as shown for one side in FIG. 2. A rear crossing path zone 50 as described before is also shown for one side of the vehicle in FIG. 2. The combined blind spot detection and rear collision warning system is designed to operate in blind spot detection mode when the vehicle is traveling in forward direction and it is designed to operate in rear crossing path warning mode when it is traveling in the reverse or backward direction as indicated by the engagement of vehicle reversing gear (not shown). The input from the radar sensors is transmitted to an electronic control unit (ECU) 22 with memory 24. The ECU has a memory such as PROM, EPROM, EEPROM, Flash, or any other memory, and various tables are contained therein wherein maximum and minimum ranges are stored. Specifically, as the radar sensor data are received, the distances to the objects as determined by the radar sensors are compared against the various maximum distances for each radar beam for the blind spot detection zones and rear crossing path collision zones stored in the tables in the ECU depending upon whether the vehicle is traveling in the forward direction or traveling in the backward direction. The ECU continuously computes the distance to an object as perceived by the radar sensor(s) and compares that distance against the maximum range limit stored in the tables in the ECU for the blind spot detection or rear collision warning as needed. For example, if the vehicle is traveling in forward direction and an object is determined to be within the blind spot detection zone, the ECU sends a signal to an alarm 26 which is electronically connected at 25 to the ECU and an operator can be alerted. The rear crossing path warning application is further explained with reference to FIG. 2.

Figure 2:
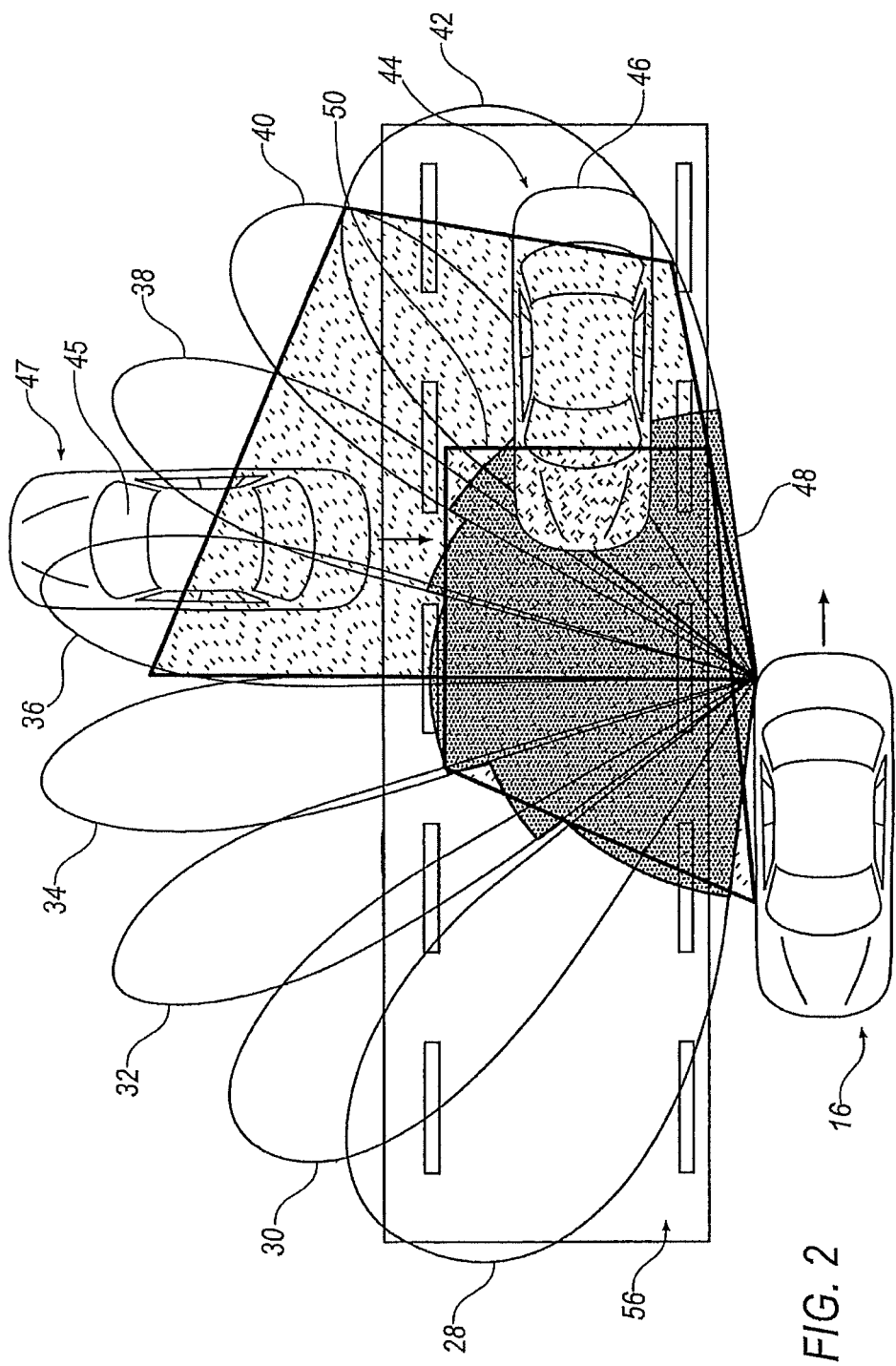
FIG. 2 is a schematic overview representation of a vehicle equipped with the combined blind spot detection and rear crossing path collision warning system of the present invention traveling rearward on a path showing the multiple beam radar system, crossing path zone and the blind spot zone on one side of said host vehicle (a similar system exists on the other side)

FIG. 2 is a schematic overview representation of a vehicle equipped with the combined blind spot detection and rear crossing path warning system of the present invention traveling on a road showing the multiple beams and detection zones of each such beam for blind spot detection zone and rear crossing path collision warning zone.

Specifically, host vehicle 16 is shown with at least one radar sensor mounted on the rear and sides of the host vehicle. By rear of the vehicle, it is understood that the sensors may be mounted in the vicinity of the B pillar or rearward of the B pillar of the host vehicle. Those skilled in the art recognize that whereas structures on one side of the vehicle are described, identical structures may be and preferably are mounted on the opposite side of the vehicle. Multiple overlapping radar beams 28, 30, 32, 34, 36, 38, 40 and 42 are shown, emanating from the rear and along the side of the host vehicle to detect oncoming vehicle 44 or 45 as it approaches from the rear in an adjacent lane 46 or from cross lane 47 respectively. Within each radar beam, programmable blind spot zone 48 forms a sub part of each multiple radar beam when the vehicle reverse gear is not engaged. In addition, the radar sensor zones further define a rear crossing path warning zone 50, to detect target vehicles approaching the host vehicle from a rear crossing path when the vehicle reverse gear is engaged. When an object or approaching vehicle is detected in the rear crossing path warning zone, and the host vehicle is engaged in reverse gear, the radar sensor system detects the approaching object presence, its speed and trajectory, and the ECU uses the data signals to estimate a severity of collision and whether the object is an imminent threat. In the event it is, a warning signal is sent to the driver indicative of the threat. The warning may be audio or visual or haptic, or any combination thereof. Preferably, the warning indicator may be visual signal in the rear view mirror and the side view mirrors. Other signals may be haptic signals in the steering wheel or seat or other area of the vehicle interior in contact with the driver, or it may be audio such as a voice or noise indication in the vehicle interior.

In one embodiment of the present invention, the operation of the rear crossing path warning system mode may be explained in greater detail. Specifically, as a host vehicle travels rearwardly as indicated by arrow 56, the radar sensors detect an object, such as a target vehicle 45 encroaching into a crossing path zone 50. The target vehicle(s) may be detected as a possible warning event when it enters into a beam, and intrudes into the rear crossing path zone. The radar sensors transmit data signals to the ECU indicative of target vehicle approaching speed, trajectory, whether it is in the rear crossing path zone, and the ECU estimates the severity of any potential collision between the host vehicle and a target vehicle. The ECU further determines whether the target vehicle(s) is a threat event, and whether such a threat of collision is imminent. If a determination is made that the threat event is imminent, a warning signal is sent to the driver indicative of the threat. Those skilled in the art understand that the object may also be approaching vehicles, or any other object that may pose a potential hazard to the host vehicle. After the threat has passed, the system deactivates the warning indicator.

FIGS. 2A and 2B are a representation of images seen in the rear view mirror 11 and side view mirrors 15 and 17 of impending blind spot and rear crossing path incidents. While the discussion indicates these images or warning are seen in the rear view mirror and the side view mirrors, it is contemplated that these images may be warning alerts on the instrument panel of the vehicle. As seen in FIG. 2A, when a vehicle 46 intrudes into blind spot 48 as seen in FIG. 2, the image of 2A is seen as a warning alert in the rearview mirror and the side view mirrors or on the instrument panel of the host vehicle indicating that a blind spot event has or is occurring. Similarly, when vehicle 47 intrudes into rear crossing zone, the image of 2B may be displayed in the rear view mirror and side view mirrors or in the instrument panel as an alert warning an operator of an impending rear crossing path event.

Figure 3:
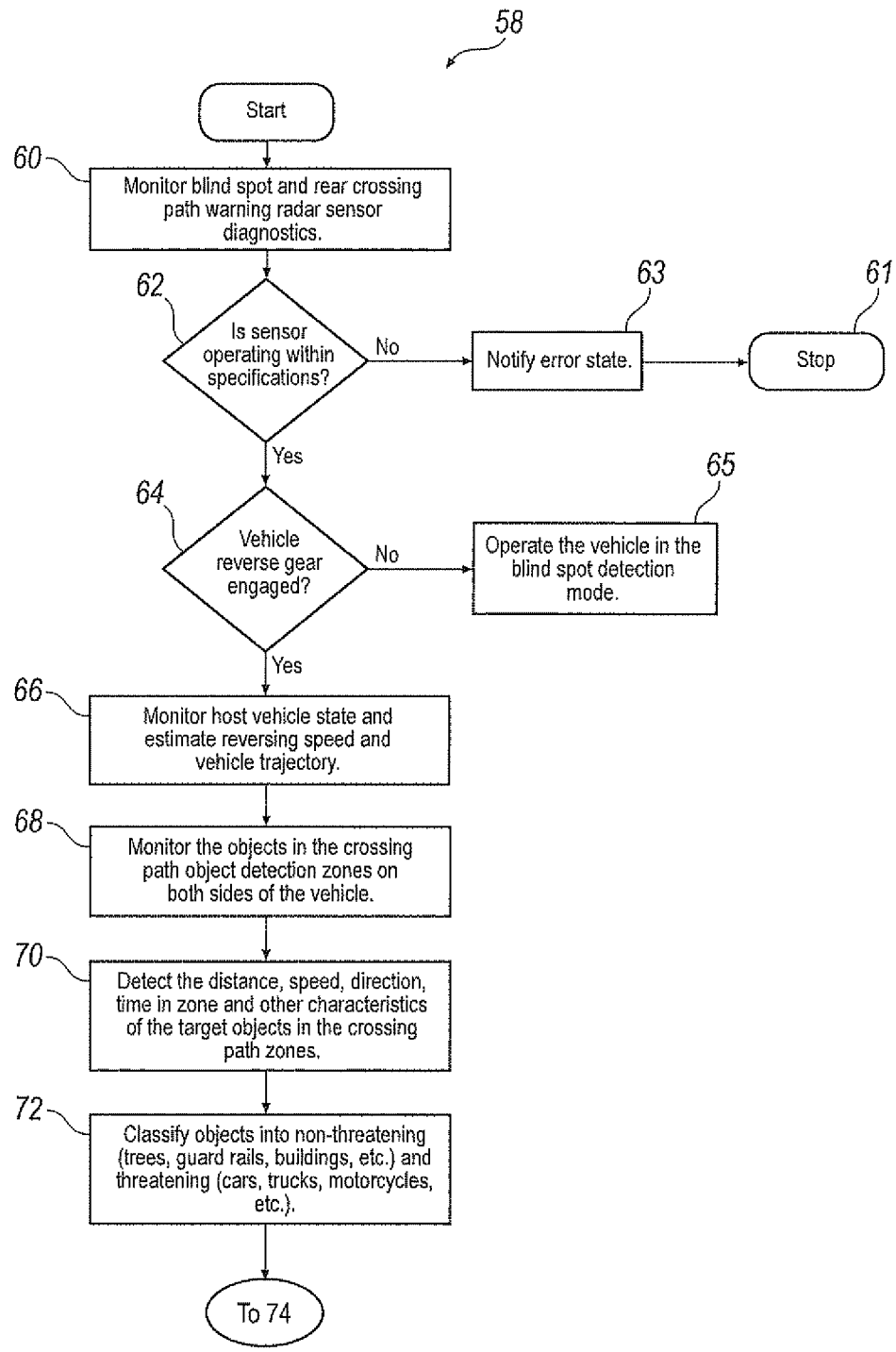
FIGS. 3 and 4 are a schematic representation of a software flowchart showing the steps of the present invention.
Figure 4:
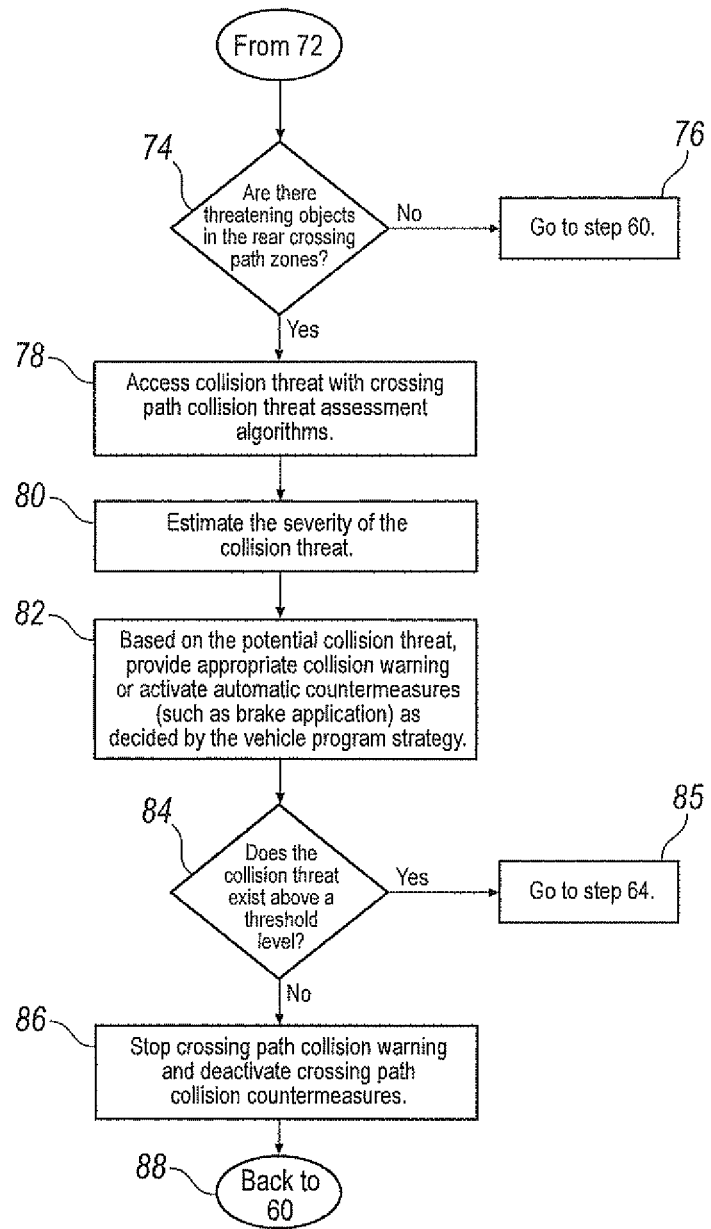

FIGS. 3 and 4 are a software flow chart of the method of combined blind spot detection and rear crossing path warning system, in a host vehicle. Specifically, method 58 begins with step 60 which is monitoring at least one vehicle blind spot and rear crossing path radar sensor diagnostics. Step 62 is determining whether a host vehicle blind spot and rear crossing path warning radar sensors are within operational specification(s). If not, step 63 is to notify operator of the error, and step 61 is to stop the method, Step 64 is determining whether a host vehicle is in reverse gear. If the determination is no, then step 65 is to operate the vehicle in the blind spot detection mode. Step 66 is determining the host vehicle state, reversing speed and host vehicle trajectory. Step 68 is determining if objects are present in crossing path detection zone on at least one side of the host vehicle. Step 70 is detecting at least one of distance, speed, direction, time in zone of at least one target in the rear crossing path zone. Step 72 is classifying objects detected in the rear crossing path zone as threatening or non-threatening objects. Step 74 is determining whether any threatening object is encroaching in the rear crossing path detection zone. If no, step 76 is return to step 60 to monitor radar sensors. If yes, step 78 is determining whether a collision threat exists and step 80 is estimating the severity of the collision threat. Step 82 is providing an appropriate warning to an operator of the host vehicle of any impending threat event. Step 82 may also include activation of automatic countermeasures such as brake application and sounding of the vehicle horn. The method may further include step 84, determining that the collision threat meets or exceeds a minimum threshold value. If yes, then step 85 is return to step 64. The vehicle is checked to ensure it is in reverse gear and the method follows the steps from 64 onward. In step 84, if the collision threat is below the minimum threshold indicating that the threat event has passed, the warning signal and the automatic countermeasures are deactivated at step 86. In step 88, the program control is transferred back to step 60 for sensor operational condition check.

While the invention has been described using particular words, those skilled in the art understand that the words utilized above are words of description and not words of limitation. Many variations and modifications are possible without departing from the scope and spirit of the invention as set forth in the appended claims.

What is claimed as new and desired to be protected by Letters Patent of the United States is:

1. A blind spot detection and rear crossing path warning system for a host vehicle, comprising:
    at least one radar sensor mounted in a rear portion of said host vehicle;
    each said radar sensor projecting at least a radar beam and transmitting radar data to an electronic control unit (ECU) with memory having tables therein with maximum and minimum radar beam ranges for a blind spot detection mode and separate maximum and minimum radar beam ranges for a rear crossing path collision mode;
    each said radar beam capable of multiple data transmission to said ECU and having a programmable range limit as determined by said ECU maximum and minimum ranges for determining at least one of distance, speed and trajectory of an approaching object, whether said object is a threat and a level of threat posed to warn an operator when an object is detected within said programmable range limit;
    said system operating in a blind spot detection mode using said maximum and minimum radar beam ranges corresponding to said blind spot detection mode when said vehicle is not in reverse gear, and operating in a rear crossing path warning mode using said maximum and minimum radar beam ranges corresponding to said rear crossing path warning mode when said vehicle is in reverse gear, wherein one radar sensor per side performs all functions of said system.

2. The blind spot detection and rear crossing path warning system of claim 1, wherein said warning may be at least one of audio, visual, or haptic warning to said operator.

3. The blind spot detection and rear crossing path warning system of claim 1, wherein said rear portion of said host vehicle is from about said vehicle's B pillar rearward.

4. The blind spot detection and rear crossing path warning system of claim 1, further including radar sensors mounted rearward of the B pillar on both sides of said host vehicle.

5. A method for operating a blind spot detection and rear crossing path warning system in a host vehicle having an electronic control unit (ECU) with memory, comprising:
    monitoring at least one host vehicle blind spot detection and rear crossing path warning radar sensor diagnostic by projecting at least one radar beam from at least one radar sensor for use for both blind side detection and rear cross path warning on a single side, said memory having tables therein with maximum and minimum radar beam ranges for a blind spot detection mode and separate maximum and minimum radar beam ranges for a rear crossing path collision mode;
    determining whether said host vehicle blind spot detection and rear crossing path warning radar sensors are within operational specifications;
    determining whether said host vehicle is in reverse gear;
    using maximum and minimum radar beam ranges corresponding to said rear crossing path warning mode when said vehicle is in reverse gear, and using said maximum and minimum radar beam ranges corresponding to said blind spot detection mode when said vehicle is not in reverse gear;
    determining said host vehicle state, reversing speed and vehicle trajectory;
    detecting objects in crossing path detection zones on at least one side of said host vehicle;
    determining at least one of distance, speed, direction, and time in zone of at least one target object in said rear crossing path zone;
    classifying objects detected in said zone into threatening and non-threatening objects;
    determining whether any threatening objects are in said rear crossing path zone;
    determining a collision threat and estimating a severity of said collision threat; and
    providing appropriate warning to an operator of said host vehicle of an impending threat event.

6. The method of claim 5, further including initiating automatic countermeasures to mitigate potential collision threat.

7. The method of claim 6, wherein the automatic countermeasures include the application of vehicle brakes and sounding of vehicle horn.

8. The method of claim 5, further including determining whether the collision threat exists above a minimum threshold value.

9. The method of claim 8, wherein when said collision threat does not exist above the minimum threshold value, the rear crossing path collision warning and associated automatic countermeasures are deactivated.

10. The method of claim 5, wherein if the radar sensors are not operating within specification, a fault is sent to the controller.

11. The method of claim 5, wherein if it is determined a vehicle is not in reverse gear, the blind spot detection and rear crossing path collision warning system is operated in the blind spot detection mode.

12. The method of claim 5, wherein the warning may be visual, audio or haptic.

13. The method of claim 12, wherein the crossing path visual warning may be displayed in the side view mirrors.

14. The method of claim 12, wherein the crossing path visual warning may be displayed in the interior rearview mirror.

15. The method of claim 5 wherein the steps of monitoring at least one vehicle blind spot detection and rear crossing path warning radar sensor diagnostics further includes projecting at least one radar beam from the same radar sensor for both blind side detection and rear crossing path warning.

\* \* \* \* \*